US008665715B2

(12) United States Patent
Ghosh et al.

(10) Patent No.: US 8,665,715 B2
(45) Date of Patent: Mar. 4, 2014

(54) METHOD AND SYSTEM FOR PROVIDING END-TO-END QOS IN CONVERGED NETWORKS USING PROBABILISTIC PREFERENTIAL ADMISSION CONTROL

(75) Inventors: Abhrajit Ghosh, Edison, NJ (US); Alexander Poylisher, Brooklyn, NY (US); Ricardo Martija, Bel Air, MD (US); Ritu Chadha, Hillsborough, NJ (US); Latha Kant, Basking Ridge, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 320 days.

(21) Appl. No.: 13/112,254

(22) Filed: May 20, 2011

(65) Prior Publication Data

US 2012/0257498 A1      Oct. 11, 2012

Related U.S. Application Data

(60) Provisional application No. 61/346,528, filed on May 20, 2010.

(51) Int. Cl.
*H04L 1/00* (2006.01)
(52) U.S. Cl.
USPC .......................................... 370/230; 455/453
(58) Field of Classification Search
USPC .................. 370/229–235; 709/223, 224, 226; 455/453, 445, 450
See application file for complete search history.

(56) References Cited

U.S. PATENT DOCUMENTS 4,984,264 A  *  1/1991  Katsube ........................ 379/197

OTHER PUBLICATIONS

S. Valaee & B. Li, "Distributed Call Admission Control for Ad Hoc Networks", published in the proceedings of VTC 2002.
S. Jamin, P. Danzig, S. Shenker and L. Zhang, "A Measurement Based Admission Control Algorithm for Integrated Services Packet Networks", IEEE/ACM Trans. on Networking, Feb. 5, 1997, pp. 56-70.
L. Breslau and S. Jamin and S. Shenker in "Comments on the Performance of Measurement-Based Admission Control Algorithsm", Infocom 2000.
A. Poylisher, F. Anjum, L. Kant, R. Chadha, "QoS Mechanisms for Opaque MANETs", MILCOM 2006.

* cited by examiner

*Primary Examiner* — Dady Chery
(74) *Attorney, Agent, or Firm* — Philip J. Feig

(57) ABSTRACT

Network management for providing and managing Quality of Service (QoS) in converged networks, and particularly management of bursty, short-lived data loads, in an opaque network where knowledge of or control over network elements is not required. Preferential treatment is provided to some subset of the network users that require better QoS assurances from the underlying network by applying probabilistic admission control decisions in conjunction with estimated network state provides improved performance for high priority data with bursty data loads.

6 Claims, 3 Drawing Sheets

METHOD AND SYSTEM FOR PROVIDING END-TO-END QOS IN CONVERGED NETWORKS USING PROBABILISTIC PREFERENTIAL ADMISSION CONTROL

CROSS-REFERENCE TO RELATED APPLICATIONS

This application claims the benefit of U.S. Provisional Application No. 61/346,528, filed on May 20, 2010 which is incorporated by reference herein in its entirety.

GOVERNMENT LICENSE RIGHTS

This invention is based upon work supported in part by the United States Army under contract DAAE07-03-9-F001. The U.S. Government has certain rights in the invention.

FIELD OF THE INVENTION

The present invention relates generally to networking and network management, in particular, for providing and managing Quality of Service (QoS) in converged networks. Specifically, the invention relates to probabilistic admission control decisions in conjunction with estimated network state to provide improved performance for high priority data with bursty data loads.

BACKGROUND OF THE INVENTION

Many converged networks are bandwidth constrained relative to the volume of data they are required to handle. As a result, network users are very often not able to get the performance that they seek. These performance shortcomings manifest as data loss and increased latency of data transfer, i.e. poor QoS.

In many cases a subset of network users requires preferential treatment relative to others. Such users would like to incur lower data loss and lower data latency than others. In such cases the network data load needs to be partitioned into multiple traffic classes for the purpose of providing higher levels of QoS for preferred users.

Converged networks are composed of heterogeneous multiple nodes, with each node being a user of the network (edge), an intermediary between end points (router) or a combination of both. It is possible for a network management solution to reduce data loss and data latency for preferred users by monitoring and controlling the overall network data volume at network routers and at the network edge. However, very often, networks may be 'opaque' in the sense that it may not be possible for a network management solution to have visibility into the various network segments and thus fully control or monitor either the routers or the edges.

The characteristics of the load (data) generated by network users can be broadly classified as having (a) well defined characteristics (in terms of mathematical predictability) with fairly long durations (aka long-lived flows) or (b) highly stochastic (e.g., bursty traffic) with relatively short durations (aka short-lived flows). Thus traffic of type (a) is easy to predict and control, while traffic of type (b) presents significant challenges in terms of prediction and control.

Others have attempted to solve variants of this problem in the past. One such approach uses "time-delay" measurements to assess the characteristics of opaque networks. The approach is based on active probing of the network.

Measurement based admission control (MBAC) is another approach that has been considered. MBAC schemes use measurements to characterize the current data load. Others have shown that different MBAC algorithms all achieve almost identical levels of performance.

An approach for performing data load admission control in conjunction with data load accounting at the edge of the network is discussed in A. Poylisher, F. Anjum, L. Kant, R. Chadha, "QoS Mechanisms for Opaque MANETs", MIL-COM 2006. The article describes a method and system for providing QoS over opaque networks. Specifically, as traffic traverses between various user networks via the opaque network, gateways at the edge of the user networks keep a record of the packets traversing into the opaque network and packets traversing out of the opaque network. These gateways also know about the traffic classes that each of these packets belong to. The gateways at the ingress (the user network where the packets originate) and the gateways at the egress (the user network where the packets terminate) coordinate amongst themselves to exchange information about the number and latency of packets exchanged between the two. This information is used by the gateway at the ingress user network to estimate the state of the opaque network. Admission of data load is based on this estimated state of the opaque network.

While a time-delay measurement solution is generally a good approach for certain types of networks, it suffers from the following severe drawbacks: (a) it is expensive in terms of the overheads introduced in order to derive latency estimates, and (b) it does not consider multiple service (traffic) classes. Hence such an approach, albeit good for the environments that it has been proposed for, cannot be used (nor extended without having to undergo major transformations) to solve the problems associated with such converged networks.

The MBAC approaches suffer due to the requirement of complete knowledge and control over the elements in the path of the data packets. In the case of opaque networks, such knowledge and control is not feasible.

While the approach described in Poylisher et al above addresses network opacity, it does not address the case of short lived, bursty data loads that are hard to predict and control. When applied to such loads, the described mechanism was found to be overly conservative in admitting data into the network resulting in poor performance for all traffic classes. This happened because all admission control decisions were performed deterministically based on the last observed network state.

SUMMARY OF THE INVENTION

The present invention provides probabilistic admission control decisions in conjunction with estimated network state to provide improved performance for high priority data with bursty data loads.

The solution described herein is significantly different in function and structure from prior solutions that have been attempted to address this problem. It is different from time-delay measurement since it (a) does not make use of expensive time delay measurements and (b) considers traffic classes.

The present invention considers the network being used to be an opaque entity meaning that we do not require any knowledge of or control over its elements. This is structurally different from the approaches advocated in the MBAC approach.

A probabilistic approach to admission control is adopted by denying portions of the admitted load in a given traffic class during a given time interval. The approach in Poylisher et al above is deterministic over a given time interval in the sense that all traffic for a given traffic class will either be admitted or denied. Since the approach in the present invention allows some traffic to be admitted, it is able to provide better overall performance for the network load.

Admission control algorithms have traditionally been applied to traffic loads composed of long-lived flows containing constant rate traffic. Such traffic loads are predictable in nature and the admission control algorithms devised for them assume such predictability. As a result, such algorithms can afford to be deterministic in nature. When dealing with short, bursty traffic loads, a probabilistic approach is not obvious. The typical approach, when handling short, bursty loads is to not perform admission control all. Instead the approach is to make use of priority queuing mechanisms. The mechanisms however do not handle the problem of traffic from multiple priority classes competing for the same set of network resources (e.g. network queues, data transmission slots).

The present solution does not introduce expensive measurement traffic as was the case for time-delay measurement and also addresses multiple traffic classes which were not considered by time-delay measurement. The present invention can work over opaque networks which is a significant advantage over the methods advocated in MBAC approaches. Finally the present invention provides the capability of handling bursty, unpredictable short-lived flows, a capability that none of the prior solutions provide while also providing better overall performance than the method advocated by Poylisher et al above since it does not deterministically cut off traffic for certain time periods.

Using the technology of the invention, network management software for various types of ad-hoc network deployments can be built. This software can be deployed as part of networks used by first responders (e.g. for disaster relief), industrial operations in remote areas (e.g. mining), municipalities that wish to provide low-cost internet access and military operations.

The present invention is primarily concerned with the management of the more challenging bursty, short-lived data loads, in an opaque network, with the aim of providing preferential treatment to some subset of the network users that require better QoS assurances from the underlying network.

The present invention will be more clearly understood when the following description is read in conjunction with the accompanying drawings.

DETAILED DESCRIPTION

Figure 1:
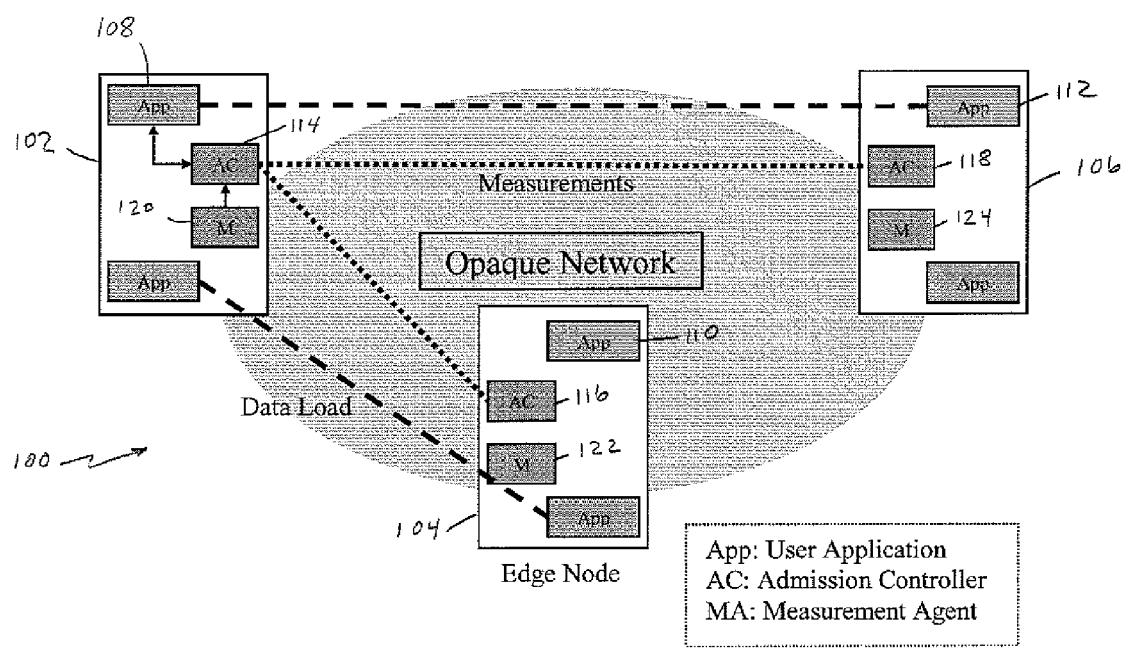
FIG. 1 is a schematic representation of an opaque network which is used by multiple nodes for transmitting data loads.

FIG. 1 shows an opaque network 100 which is used by multiple nodes ("Edge Nodes") 102, 104, 106 for transmitting data loads. Data loads are generated by one or more applications ("Apps") 108, 110, 112 operating at each node. Each node contains an admission controller (AC) 114, 116, 118 and a measurement agent (MA) 120, 122, 124. The AC and the MA implement the present approach for providing QoS in converged networks using probabilistic preferential admission control. Each application requests the admission controller for permission to transmit a burst of packets in the form of an 'admission request'. The admission controller uses data received from the measurement agent to deter wine whether to admit the burst or not. Each measurement agent monitors the volume of traffic sent and received by the node and periodically reports this data to the local admission controller. Each admission controller on a node receiving traffic, reports the received traffic volume to the admission controller on the node that originates the received traffic.

The algorithm employed by the admission controller attempts to reduce admitted traffic load of lower priority traffic in case of observed lowered throughput. More specifically, it does so by reducing the admission rate of lower priority traffic classes more aggressively than that of higher priority traffic classes. This reduction is exercised based on independently observed throughput, at each sender node. Such a method therefore obviates the need for expensive co-ordination and overheads, while yet achieving 'good' solutions in a stochastically varying networking environment. Here, throughput is defined as the ratio of received traffic volume at the destination nodes to sent traffic volume at the source node and is computed by the source node's admission controller.

The approach outlined above provides preferential treatment to high priority network traffic when it contends with low priority network traffic for limited network resources. Network resources include (a) data queues that are used to store traffic prior to transmission and (b) data transmission time slots that are allocated to a transmitter based on its transmission requirements. In both cases, the described approach reduces the rate at which lower priority traffic consumes either type of resource.

Now enumerate and define the various data objects that are used by the admission controller's algorithm:

Traffic class: This identifies a specific portion of the network data load based on its relative priority. A finite number of traffic classes are assumed to exist. Each edge node is assumed to implement a priority queuing structure that the edge uses to send traffic out on the network. Schedulers within each node ensure that traffic from a lower priority queue cannot enter the network unless higher priority queues are empty. Traffic that belongs to higher priority portions of the data load enters higher priority queues at the sending edge node. The combination of traffic heterogeneity and asynchronous arrival patterns renders it possible for some higher priority traffic classes to share the same network queue as some lower priority traffic classes.

Time interval: This refers to an interval of time during which a node's measurement agent updates its counts of bytes received and bytes sent (in addition to other statistics described below). At the end of a time interval, each node's admission controller sends a count of bytes received from a specific sender node to the latter's admission controller. The size of a time interval is constant across all nodes and the start times of each interval are synchronized across all nodes.

$w_c$: Static weight assigned to each traffic class c. A higher weight is assigned to a higher priority traffic class. This is a number between 0 and 1. The weight for a given traffic class is the same across all nodes.

$l_{c,j}$: Requested bit rate (submitted load) in traffic class c during time interval j. This quantity is initialized to 0 at the beginning of each time interval and updated at the time of each admission request using the bandwidth and duration parameters that are part of the admission request. This quantity is computed at each ingress node. For example:

Consider a scenario where time intervals are 30 seconds long. During interval 5, two admission requests are seen for class C3.

The first admission request in interval 5 asks for:
bandwidth: 1200 Bytes/sec, duration: 2 seconds
rb1=requested bit rate for admission request 1
=(2*1200/30)*8=640 bits/sec
The second admission request in interval 5 asks for:
bandwidth: 800 Bytes/sec, duration: 1 second
rb2=requested bit rate for admission request 2
=(800/30)*8=213.3 bits/sec
The total requested bit rate in class C3 during interval 5 is thus:
l3,5=Sum(rbi)[i=1..2]=640+213.3=853.3 bps
The total requested bit rate is computed independent of the egress nodes to which traffic will be sent.

uc,j: Outgoing bit rate (admitted load) in traffic class c during time interval j. This is computed at each sender node by counting the number of bytes transmitted during interval j and dividing by the size of the time interval. This computation is aggregated across all receiver nodes.

vc,j: Incoming bit rate (completed load) in traffic class c during time interval j. This is computed at each sender node by using a count of bytes actually received by every receiver node, from this sender, during interval j and dividing by the size of the time interval. This computation is aggregated across all receiver platforms at the sender. The count of bytes received, however, is maintained by each receiver node on a per-sender node basis and is sent to the corresponding sender at the end of each time interval.

ec,j: Projected requested bit rate (expected load) in traffic class c during time interval j. This is computed at each sender node at the beginning of time interval j as shown in the algorithm description below. It represents a projection of the load that will be submitted during time interval j in traffic class c. The projection is an aggregate projection across the receiver nodes to which traffic will be sent.

pc,j: Projected incoming bit rate for traffic class c during time interval j. This is computed at each sender node at the beginning of time interval j as shown in the algorithm description below. It represents a projection of the load that will complete during time interval j, in traffic class c. The projection is made at the sender and is an aggregate projection across all the nodes at which traffic will be received.

n: Size of observation window. This is the number of preceding time intervals of data (submitted, admitted and completed bit rates) that is considered while processing a particular admission request during any time interval.

rc,j: Probability of rejecting an admission request in traffic class c during time interval j. This is computed at the beginning of time interval j as shown in the algorithm description below. It is used at the time of each admission request as shown in the algorithm description below. It represents the probability with which a given admission request will be rejected during time interval j.

Figure 2:
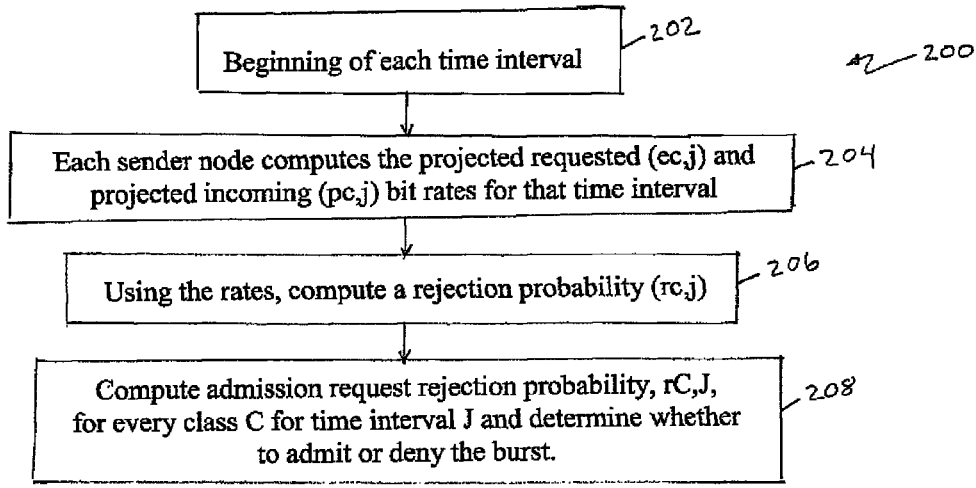
FIG. 2 is a flow diagram of a method implementing the present invention.

Algorithm Description:
FIG. 2 is a flow diagram 200 of a method implementing the present invention.
Processing at the beginning of each time interval:
At the beginning of each time interval 202, each sender node computes the projected requested (ec,j) and projected incoming (pc,j) bit rates for that time interval 204. These rates are then used to compute a rejection probability (rc,j) 206 that will be used at the time of processing each admission request submitted during that interval. The decision to admit or deny the burst is determined from the calculated probability for every class c for the time interval j 208.

Figure 3:
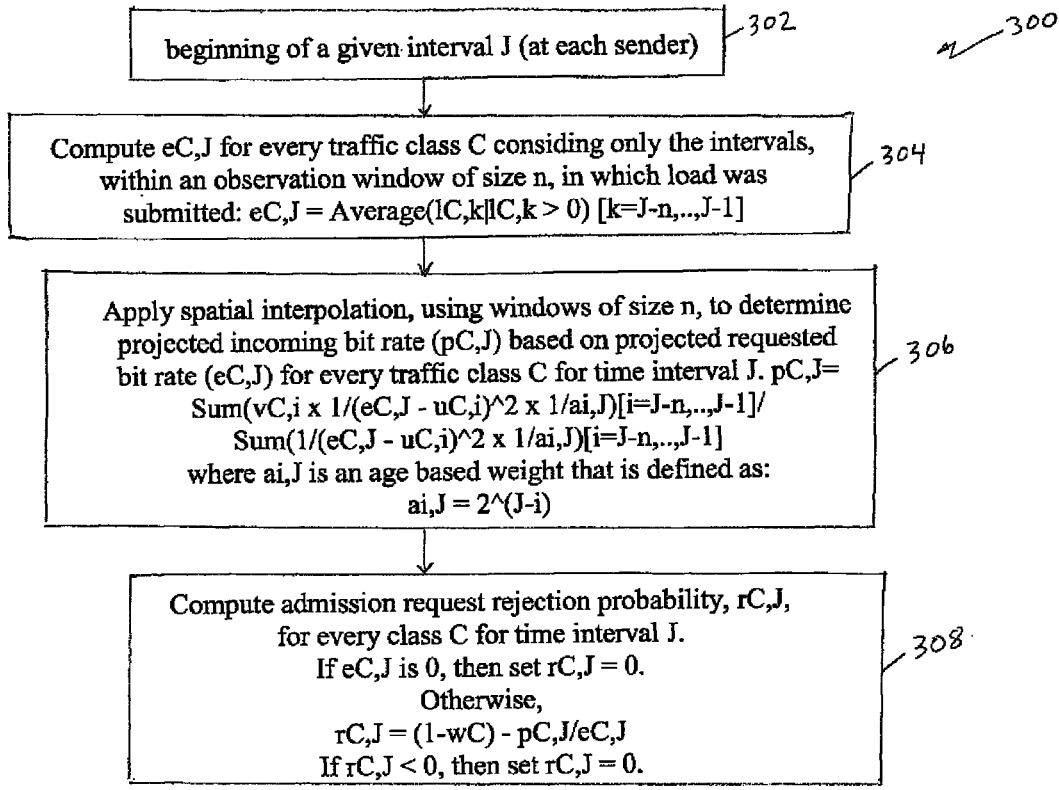
FIG. 3 is a flow diagram of a computation in step 206.

FIG. 3 is a flow diagram of the computation in step 206.
At the beginning of a given interval J (at each sender) 302:
1) Compute eC,J for every traffic class C 304. Consider only the intervals, within an observation window of size n, in which load was submitted:

$eC,J = \text{Average}(1C,k | 1C,k>0)[k=J-n, \ldots, J-1]$

2) Apply spatial interpolation 306, using windows of size n, to determine projected incoming bit rate (pC,J) based on projected requested bit rate (eC,J) for every traffic class C for time interval J.

$pC,J =$ $\text{Sum}(vC,i \times 1/(eC,J-uC,i)^2 \times 1/ai,J)[i=J-n, \ldots, J-1]/$ $\text{Sum}(1/(eC,J-uC,i)^2 \times 1/ai,J)[i=J-n, \ldots, J-1]$ Here ai,J is an age based weight that is defined as:

$ai,J = 2^{(J-i)}$

Figure 4:
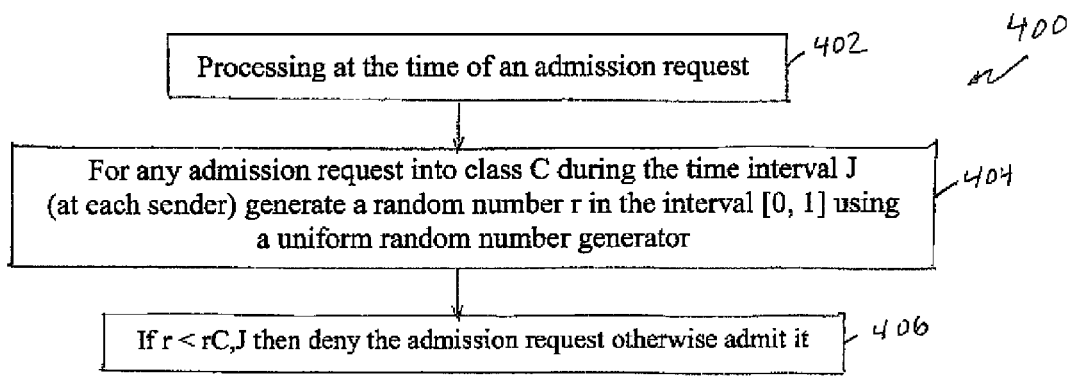
FIG. 4 is a flow diagram of processing at the time of an admission request.

3) Compute admission request rejection probability, rC,J, 308 for every class C for time interval J.
If eC,J is 0, then set rC,J=0.
Otherwise, $rC,J = (1-wC) - pC,J/eC,J$ If rC,J<0, then set rC,J=0.
FIG. 4 is a flow diagram 400 of the processing at the time of an admission request 402
The admission request rejection probability (rC,J), computed at the beginning of each interval is used at the time of each admission request as shown below:
For any admission request into class C during time interval J (at each sender):
1) Generate a random number r in the interval [0, 1] using a uniform random number generator 404.
2) If r<rC,J then deny the admission request otherwise admit it 406.
The results of the present invention are described as follows:
A Java language prototype of the Admission Controller and a C++ language prototype of the Measurement Agent were developed. The prototypes were evaluated in an emulated network consisting of 20 nodes. Each node generates a mix of traffic belonging to the following 5 traffic classes: C5, C4, C3, C2 and C1. C5 was the highest priority and C1 was the lowest priority traffic class. Traffic classes C4 and C1 were dominant components of the traffic load. The objective was to see if lower priority traffic could be throttled down to provide favorable treatment for higher priority traffic.
The characteristics of each traffic class were as follows:
C5: Single packet flows (UDP payload size=1366 bytes), Inter arrival time modeled as Pareto, Average=27.9 seconds, shape=1.3
C4: Short burst of packets (UDP payload size=30 bytes), Burst duration modeled as Pareto, Average=1.1114 seconds, shape=1.9134, Traffic rate during burst=6.4 Kbps, inter arrival time for bursts also modeled as Pareto, Average=61.86 seconds, shape=1.35
C3: Single packet flows (UDP payload size=1366 bytes), Inter arrival time modeled as Pareto, Average=38.38 seconds, shape=1.43
C2: Single packet flows (UDP payload size=676 bytes), Inter arrival time modeled as Pareto, Average=5.13 seconds, shape=1.23
C1: Single packet flows (UDP payload size=528 bytes), Inter arrival time modeled as Pareto, Average=1.96 seconds, shape=1.22, Experiments were conducted as follows:

12 runs were attempted with each run being approximately 2.2 hours long. During each run, traffic with the characteristics described above was generated from each node. Two sets of runs were carried out. In one set no admission control was used (Base case) while in the other our probabilistic preferential admission control mechanism (AC) was active.

Base case average packet delivery ratios per traffic class:

C5: 0.49 (+/−0.006); C4: 0.48 (+/−0.004); C3: 0.41 (+/−0.02); C2: 0.61 (+/−0.006); C1: 0.68 (+/−0.005)

Admission controlled case average packet delivery ratios per traffic class:

C5: 0.51 (+/−0.012); C4: 0.53 (+/−0.005); C3: 0.44 (+/−0.022); C2: 0.62 (+/−0.005); C1: 0.62 (+/−0.006)

Improvement Summary:

4.6% for C5; 9.78% for C4; 6.69% for C3; 1.13% for C2

Cost of Improvement 7.99% reduction in C1

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

While there has been described and illustrated a system and method for solving networking and network management for providing and managing Quality of Service (QoS) in converged networks, it will be apparent to those skilled in the art that variations and modifications are possible without deviating from the broad principles and teachings of the present invention which shall be limited solely by the scope of the claims appended hereto.

What is claimed is:

1. An opaque network used by multiple nodes for transmitting data loads generated by applications operating at each node comprising:

a plurality of nodes outside the opaque network, each node containing at least one application, an admission controller and a measurement agent;

each application requesting permission from the associated admission controller to transmit a burst of packets;

said measurement agent monitoring volume of traffic sent and received by the associated node and periodically reporting the monitored information; and said admission controller receiving the monitored information from the associated measurement agent and probabilistically determining whether to admit or deny the burst;

wherein said admission controller reduces admitted traffic load of lower priority traffic by reducing the admission rate of lower priority traffic class based on independent observed throughput at each sender node, where the throughput is defined as the ratio of received traffic volume at the destination nodes to sent traffic volume at the source node and is computed by the source node's admission controller.

2. An opaque network used by multiple nodes for transmitting data loads generated by applications operating at each node comprising:

a plurality of nodes outside the opaque network, each node containing at least one application, an admission controller and a measurement agent;

each application requesting permission from the associated admission controller to transmit a burst of packets;

said measurement agent monitoring volume of traffic sent and received by the associated node and periodically reporting the monitored information; and said admission controller receiving the monitored information from the associated measurement agent and probabilistically determining whether to admit or deny the burst;

wherein said admission controller reduces admitted traffic load of lower priority traffic by reducing the admission rate of lower priority traffic class based on independent observed throughput at each sender node, where the throughput is defined as the ratio of received traffic volume at the destination nodes to sent traffic volume at the source node and is computed by the source node's admission controller; and where the admission controller reduces admitted traffic by:

at the beginning of each time interval J, each sender node computes the projected requested (ec,j) and projected incoming (pc,j) bit rates for that time interval, using these rates to compute a rejection probability (rc,j) that will be used at the time of processing each admission request submitted during the interval J;

each sender node compute eC,J for every traffic class C, considering only the intervals, within an observation window of size n, in which load was submitted where: eC,J=Average(IC,k|IC,k>0) [k=J−n, . . . , J−1]; and applying spatial interpolation, using windows of size n, to determine projected incoming bit rate (pC,J) based on projected requested bit rate (eC,J) for every traffic class C for time interval J, where $$pC,J=\text{Sum}(vC,i \times 1/(eC,J-uC,i)^2 \times 1/ai,J)[i=J-n, \ldots, J-1]/\text{Sum}(1/(eC,J-uC,i)^2 \times 1/ai,J)[i=J-n, \ldots, J-1]$$

where ai,J is an age based weight that is defined as:

$$ai,J=2^{\wedge}(J-i)$$

computing admission request rejection probability, rC,J, for every class C for time interval J If eC,J is 0, then set rC,J=0

Otherwise, $$rC,J=(1-wC)-pC,J/eC,J$$

If rC,J<0, then set rC,J=0.

3. The opaque network as set forth in claim 2, where the admission request rejection probability (rC,J), computed at the beginning of each interval is used at the time of each admission request by:

for any admission request into class C during time interval J (at each sender):

generate a random number r in the interval [0, 1] using a uniform random number generator; and if r<rC,J then deny the admission request otherwise admit it.

4. In an opaque network used by a plurality of nodes for transmitting data loads generated by applications operating at each node, each node containing at least one application, an admission controller and a measurement agent, a method for transmitting data loads comprising:

requesting permission by an application from the associated admission controller to transmit a burst of packets;

monitoring by the measurement agent of the volume of traffic sent and received by the associated node and periodically reporting the monitored information;

receiving at the admission controller the monitored information from the associated measurement agent and probabilistically determining whether to admit or deny the burst; and reducing admitted traffic load of lower priority traffic by reducing the admission rate of lower priority traffic class based on independent observed throughput at each sender node, where the throughput is defined as the ratio of received traffic volume at the destination nodes to sent traffic volume at the source node and is computed by the source node's admission controller.

5. In an opaque network used by a plurality of nodes for transmitting data loads generated by applications operating at each node, each node containing at least one application, an admission controller and a measurement agent, a method for transmitting data loads comprising:

requesting permission by an application from the associated admission controller to transmit a burst of packets;

monitoring by the measurement agent of the volume of traffic sent and received by the associated node and periodically reporting the monitored information; and receiving at the admission controller the monitored information from the associated measurement agent and probabilistically determining whether to admit or deny the burst;

further comprising reducing admitted traffic load of lower priority traffic by reducing the admission rate of lower priority traffic class based on independent observed throughput at each sender node, where the throughput is defined as the ratio of received traffic volume at the destination nodes to sent traffic volume at the source node and is computed by the source node's admission controller;

where the admitted traffic is reducing by:

at the beginning of each time interval J, computing at each sender node the projected requested (ec,j) and projected incoming (pc,j) bit rates for that time interval, computing a rejection probability (rc,j) using these rates that will be used at the time of processing each admission request submitted during the interval J;

each sender node computing eC,J for every traffic class C, considering only the intervals, within an observation window of size n, in which load was submitted where: eC,J=Average(IC,k|IC,k>0) [k=J−n, . . . , J−1]; and applying spatial interpolation, using windows of size n, to determine projected incoming bit rate (pC,J) based on projected requested bit rate (eC,J) for every traffic class C for time interval J, where $$pC,J=\text{Sum}(vC,i \times 1/(eC,J-uC,i)^2 \times 1/ai,J)[i=J-n, \ldots, J-1]/\text{Sum}(1/(eC,J-uC,i)^2 \times 1/ai,J)[i=J-n, \ldots, J-1]$$

where ai,J is an age based weight that is defined as:

$$ai,J=2^{\wedge}(J-i)$$

computing admission request rejection probability, rC,J, for every class C for time interval J If eC,J is 0, then set rC,J=0

Otherwise, $$rC,J=(1-wC)-pC,J/eC,J$$

If rC,J<0, then set rC,J=0.

6. The method as set forth in claim 5, where the admission request rejection probability (rC,J), computed at the beginning of each interval is used at the time of each admission request by:

for any admission request into class C during time interval J (at each sender):

generating a random number r in the interval [0, 1] using a uniform random number generator; and if r<rC,J then deny the admission request otherwise admit it.

* * * * *

UNITED STATES PATENT AND TRADEMARK OFFICE
CERTIFICATE OF CORRECTION

PATENT NO. : 8,665,715 B2
APPLICATION NO. : 13/112254
DATED : March 4, 2014
INVENTOR(S) : Ghosh et al.

It is certified that error appears in the above-identified patent and that said Letters Patent is hereby corrected as shown below:

In the Drawings

In Fig. 3, Sheet 2 of 3, for Tag "304", in Line 1, delete "considing" and insert -- considering --, therefor.

In the Specification

In Column 4, Line 1, delete "deter wine" and insert -- determine --, therefor.

In the Claims

In Column 10, Line 64, in Claim 6, delete "generator; and" and insert the same at Line 63, after "number", as a continuation subpoint.

Signed and Sealed this
Thirty-first Day of March, 2015

Michelle K. Lee
*Director of the United States Patent and Trademark Office*